US009337674B2

(12) United States Patent
Wang (10) Patent No.: US 9,337,674 B2
(45) Date of Patent: May 10, 2016

(54) DESKTOP CHARGER (71) Applicant: CHEN-SOURCE INC., Taoyuan County (TW)

(72) Inventor: Jung-Kun Wang, Taoyuan County (TW)

(73) Assignee: CHEN-SOURCE INC., Guishan Township, Taoyuan County (TW)

( * ) Notice: Subject to any disclaimer, the term of this patent is extended or adjusted under 35 U.S.C. 154(b) by 825 days.

(21) Appl. No.: 13/667,889

(22) Filed: Nov. 2, 2012

(65) Prior Publication Data
US 2014/0125271 A1 May 8, 2014

(51) Int. Cl.
H02J 7/00 (2006.01)
G06F 1/16 (2006.01)

(52) U.S. Cl.
CPC ............. *H02J 7/0044* (2013.01); *G06F 1/1632* (2013.01); *H02J 7/0027* (2013.01)

(58) Field of Classification Search
CPC .............................. H02J 7/0027; H02J 7/0044
USPC .................................................. 320/107, 115
See application file for complete search history.

(56) References Cited

U.S. PATENT DOCUMENTS

| 6,452,805 | B1 * | 9/2002 | Franz et al. | 361/724 |
| 2003/0111245 | A1 * | 6/2003 | Haggerty | 174/50 |
| 2004/0070929 | A1 * | 4/2004 | Lin | 361/685 |
| 2011/0267782 | A1 * | 11/2011 | Petrick et al. | 361/724 |
| 2011/0309591 | A1 * | 12/2011 | Petrick et al. | 280/47.35 |

* cited by examiner

Primary Examiner — Richard Isla Rodas
Assistant Examiner — David V Henze-Gongola
(74) Attorney, Agent, or Firm — Muncy, Geissler, Olds & Lowe, P.C>

(57) ABSTRACT

A desktop charger includes a housing having a face panel with multiple insertion slots and an openable front cover plate for closing the face panel, a rack mounted inside the housing and defining multiple insertion slots in communication with the insertion slots of the face panel, and a power supply module including a system circuit board holding multiple electrical connectors in respective connector holes in the face panel for the connection of transmission cables of mobile electronic products being inserted into the insertion slots of the face panel and the insertion slots of the rack, a power adapter connectable to an external power source for power input and a control system for controlling the operation of the system circuit board and the power adapter and for charging the inserted mobile electronic products and for allowing the inserted mobile electronic products to transmit signals and data during charging.

9 Claims, 7 Drawing Sheets

DESKTOP CHARGER

BACKGROUND OF THE INVENTION

1. Field of the Invention

The present invention relates to electronic chargers for charging mobile electronic devices and more particularly, to a desktop charger, which comprises a housing, a rack mounted inside the housing for holding mobile electronic devices for charging, and a power supply module for receiving and charging multiple mobile electronic devices being inserted into respective insertion slots in the rack and for allowing the inserted mobile electronic devices to transmit signals and data during charging.

2. Description of the Related Art

With the rapid development of electronic technology and multimedia revolution, notebook computers, tablet computers, smart phones, PDAs and many other mobile electronic devices are created to meet different application requirements. It is now the market tendency to create mobile electronic devices having light, thin, short and small characteristics. Further, computer-related hardware and software products have been continuously developed to service people for practical applications in our work, life and entertainment.

For making mobile electronic devices having light, thin, short and small characteristics, only precision and small-sized electronic components can be used. However, these precision and small-sized electronic components are fragile and easily breakable. Many protective cases, bags and other carrier means for carrying mobile electronic devices are commercially available. However, these protective cases, bags and carrier means are designed for carrying one individual mobile electronic device. Further, a school, organization or company may use a large number of notebook computers, tablet computers, PADs and/or many other mobile electronic devices for the purpose of information classification or to meet different software application requirements. These notebook computers, tablet computers, PADs and/or mobile electronic devices may be left on desks or tables after work. It is inconvenient to manage the storage of a large number of mobile electronic devices. Mobile electronic devices may be stolen easily if they are directly left on desks or tables in a room.

Further, many portable storage devices for mobile electronic devices are commercially available. However, these portable storage devices are simply designed for keeping and/or carrying mobile electronic devices. If the battery power of a mobile electronic device is low, the electronic device must be charged before carrying it to another place for application. Further, when going to update an educational software or other software program in each of a large number of notebook computers or other mobile electronic devices, these notebook computers or mobile electronic devices must be boosted and respectively connected to a host computer or server system. It takes much time to arrange the related transmission cables and to connect the related transmission cables to the host computer or server system. Further, during data transmission between the mobile electronic devices and the host computer or server system, the person in charge cannot charge the batteries of these mobile electronic devices.

Therefore, it is desirable to provide means practical for keeping and charging mobile electronic devices and allowing mobile electronic devices to transmit signals and data during charging.

SUMMARY OF THE INVENTION

The present invention has been accomplished under the circumstances in view. It is therefore the main object of the present invention to provide a desktop charger, which is capable of charging multiple mobile electronic devices at a time, allowing the mobile electronic devices to transmit signals and data during charging.

To achieve this and other objects of the present invention, a desktop charger comprises a housing defining therein an accommodation space, a rack, and a power supply module. The housing comprises a face panel having a plurality of vertical insertion slots arranged in parallel and a plurality of connector holes arranged in a horizontal line at a bottom side relative to the vertical insertion slots, and a front cover plate movable to open and close the face panel. The rack is mounted in the accommodation space inside the housing, comprising a plurality of vertical insertion slots respectively disposed in communication with the vertical insertion slots of the face panel for the insertion of mobile electronic products to be charged. The power supply module is mounted in the accommodation space inside the housing and disposed at the bottom side of the rack, comprising a plurality of electrical connectors respectively mounted in the connector holes of the face panel for the connection of transmission cables of mobile electronic products being inserted into the vertical insertion slots of the face panel and the respective vertical insertion slots of the rack, and a control system electrically connected with the electrical connectors and adapted to provide power supply to each mobile electronic product being electrically connected to one respective electrical connector and to control transmission of signals between each electrical connector and the respective linked mobile electronic product.

DETAILED DESCRIPTION OF THE PREFERRED EMBODIMENT

Figure 1:
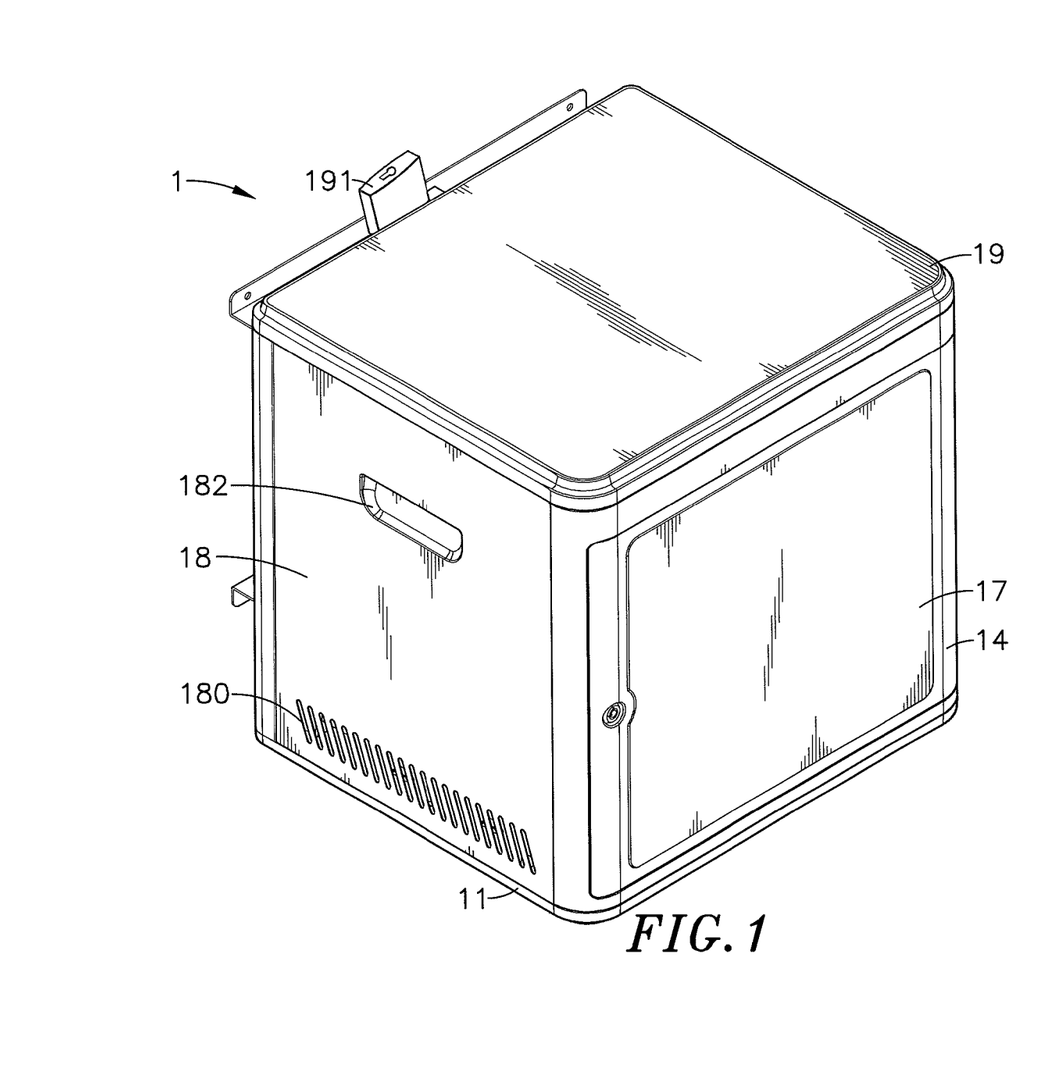
FIG. 1 is an oblique front elevation of a desktop charger in accordance with the present invention.
Figure 2:
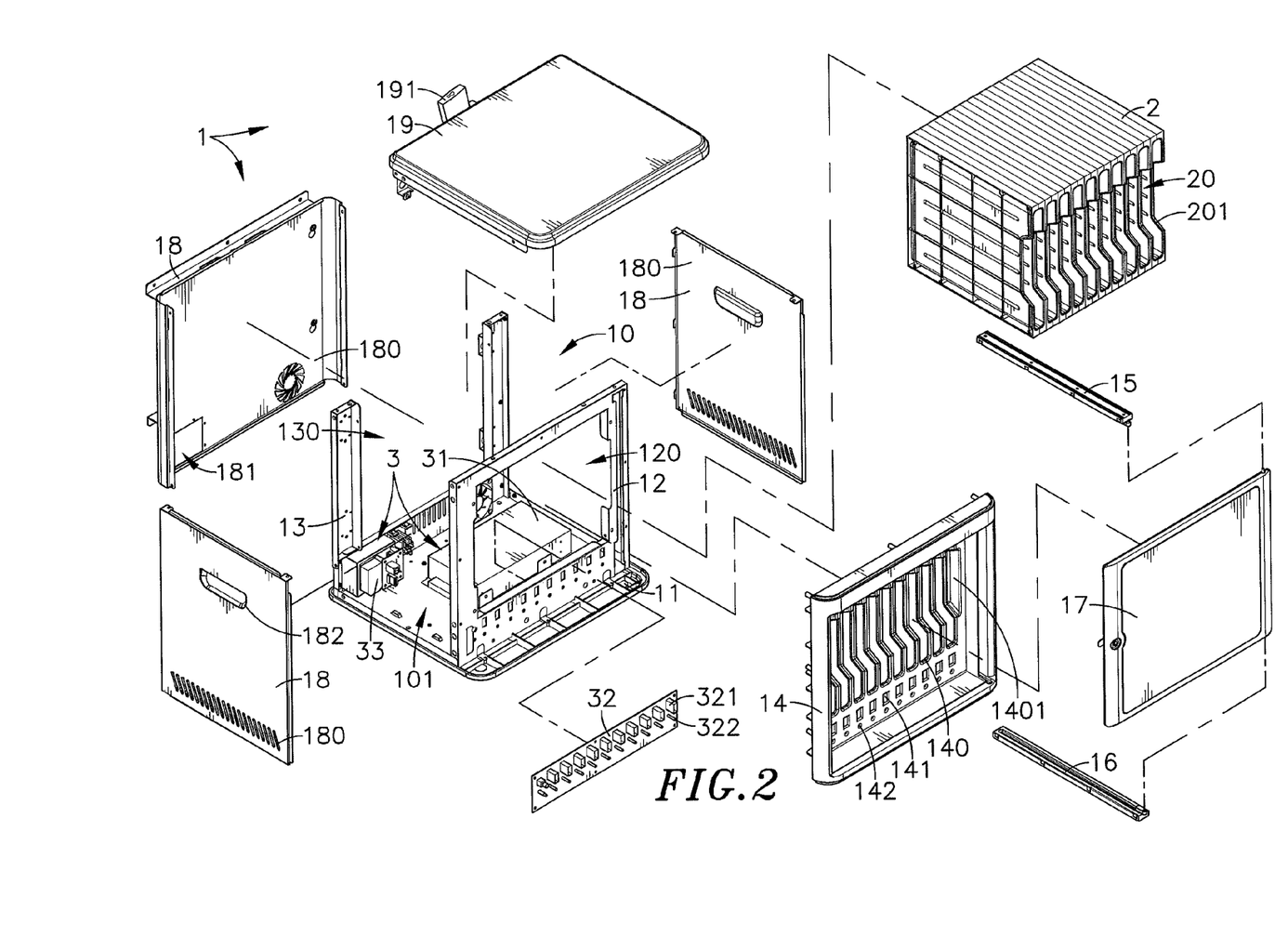
FIG. 2 is an exploded view of the desktop charger in accordance with the present invention.
Figure 3:
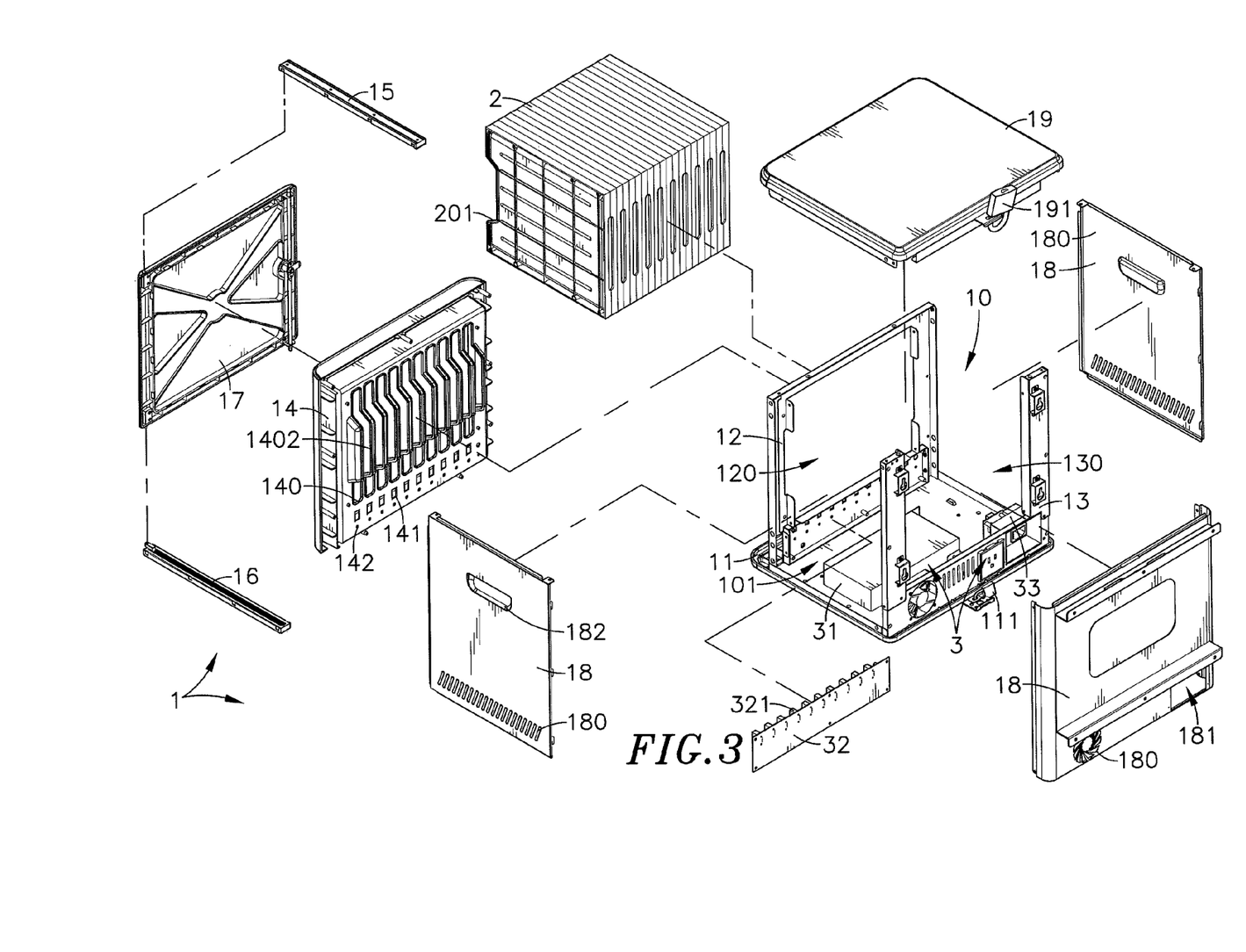
FIG. 3 corresponds to FIG. 2 when viewed from another angle.
Figure 4:
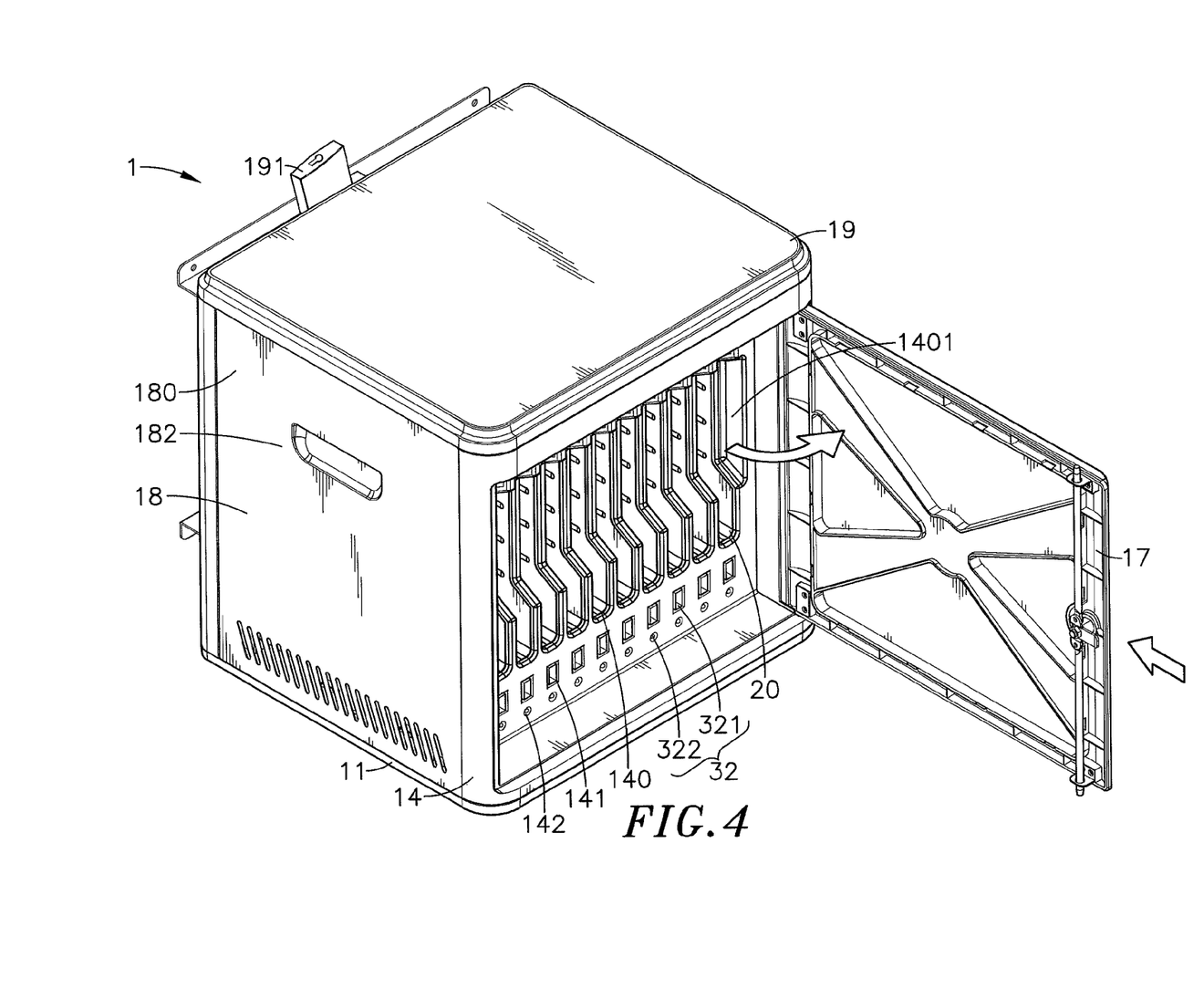
FIG. 4 is an oblique elevational view of the present invention, illustrating the front cover plate of the housing of the desktop charger opened.
Figure 5:
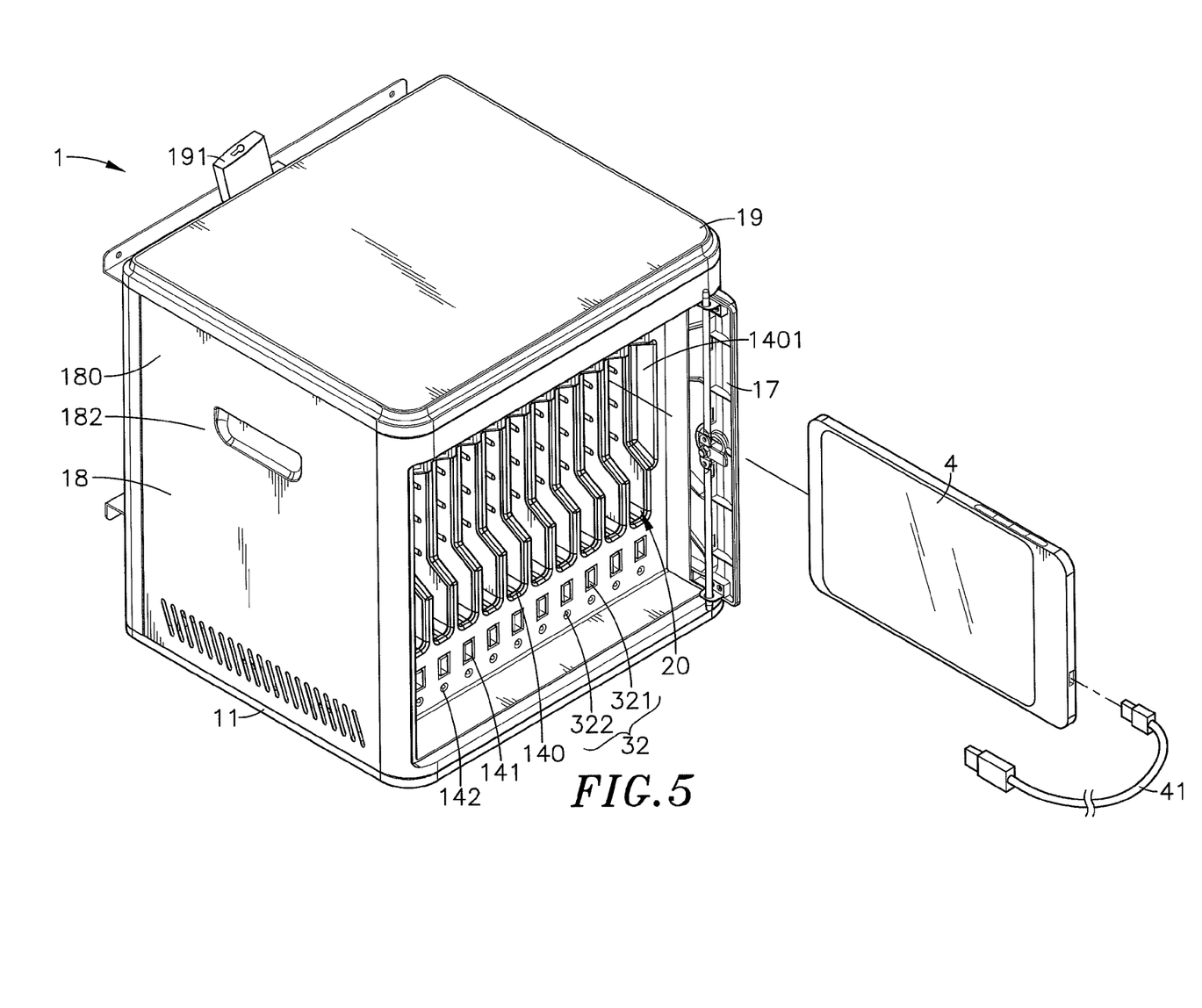
FIG. 5 is a schematic applied view of the present invention, illustrating the front cover plate opened and received at one lateral side of the housing for allowing insertion of a mobile electronic product into the inside of the desktop charger.
Figure 6:
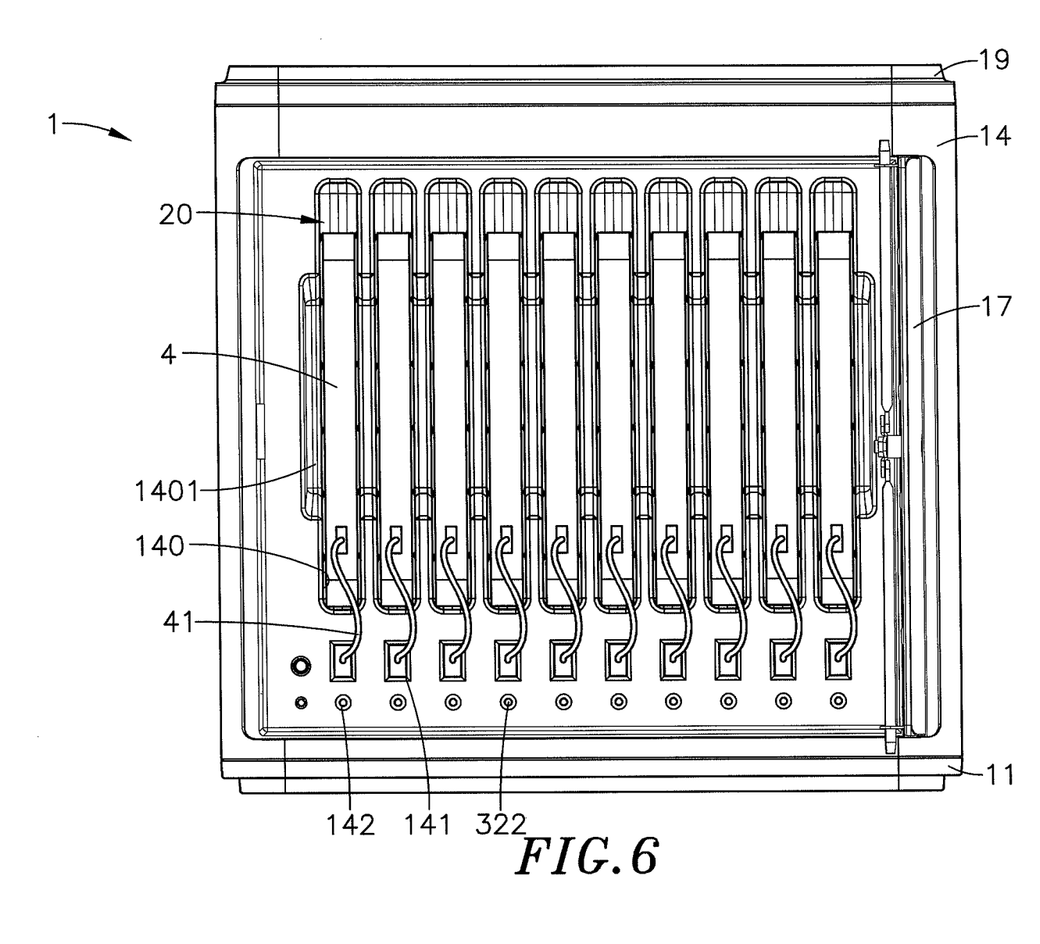
FIG. 6 is a schematic front view of the present invention, illustrating multiple mobile electronic products inserted into the vertical insertion slots of the face panel of the housing of the desktop charger into the inside of the rack.
Figure 7:
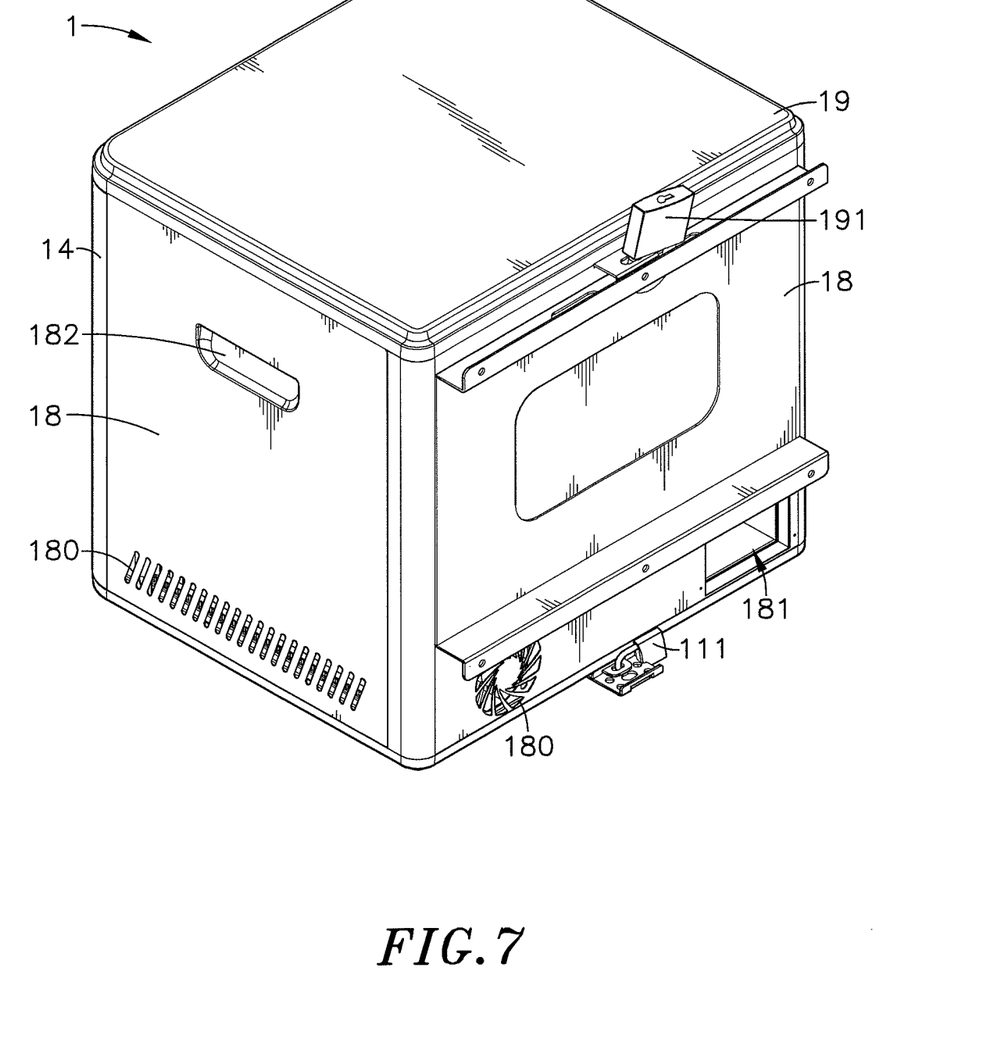
FIG. 7 is an oblique rear elevation of the desktop charger in accordance with the present invention.

Referring to FIGS. 1-3, a desktop charger in accordance with the present invention is shown. The desktop charger comprises a housing 1, a rack 2, and a power supply module 3.

The housing 1 comprises a bottom panel 11, a front support frame 12 defining therein an opening 120 and perpendicularly upwardly arranged at a front side of the bottom panel 11, a back support frame 13 defining therein an opening 130 and perpendicularly upwardly arranged at a rear side of the bottom panel 11 opposite to the front support frame 12, an accommodation space 10 defined between the front support frame 12 and the back support frame 13 above the bottom panel 11, a face panel 14, which is mounted on the outside wall of the front support frame 12, comprising a plurality of vertical insertion slots 140 cut through opposing front and back sides thereof and arranged in parallel, a front recess portion 1401 transversely disposed at a front side of the vertical insertion slots 140, a plurality of connector holes 141 arranged in a horizontal line at a bottom side relative to the vertical insertion slots 140 and respectively kept in vertical alignment with the vertical insertion slots 140, a plurality of indicator light holes 142 arranged in a horizontal line at a bottom side relative to the connector holes 141 and respectively kept in vertical alignment with the connector holes 141 and the vertical insertion slots 140 and a plurality of flanges 1402 respectively extended from two opposite lateral sides of each of the vertical insertion slots 140 and inserted into the opening 120 of the front support frame 12 and the accommodation space 10, a top rail 15 horizontally connected between the top end of the front support frame 12 and the top end of the back support frame 13 and affixed to one side edge of the face panel 14, a bottom rail 16 horizontally connected between the bottom end of the front support frame 12 and the bottom end of the back support frame 13 and affixed to the same side edge of the face panel 14, a front cover plate 17 slidably coupled between the top rail 15 and the bottom rail 16 and movable out of the top rail 15 and the bottom rail 16 and then turnable relative to the top rail 15 and the bottom rail 16 through 90° angle from an open position where the face panel 14 is left open to a close position where the front cover plate 17 keeps the face panel 14 from sight, three peripheral cover plates 18 respectively mounted between the front support frame 12 and the back support frame 13 at opposing left and right sides and on the outside wall of the back support frame 13, and a top cover plate 19 horizontally mounted on the front support frame 12 and the back support frame 13 at the top side opposite to the bottom panel 11. According to the present preferred embodiment, the front support frame 12 is a rectangular open frame; the back support frame 13 has a substantially U-shaped profile. Further, each peripheral cover plate 18 comprises a plurality of air vents 180 and a grip recess 182. Further, the peripheral cover plate 18 that is mounted on the outside wall of the back support frame 13 further comprises an adapter hole 181 located at one corner thereof.

The rack 2 defines therein a plurality of vertical insertion slots 20 arranged in parallel corresponding to the vertical insertion slots 140 of the face panel 14, and a front recess portion 201 transversely disposed at a front side of the vertical insertion slots 20.

The power supply module 3 comprises a control system 31, a system circuit board 32 and a power adapter 33. The control system 31 is electrically connected with the system circuit board 32 and the power adapter 33, comprising a circuit layout (not shown) with built-in power source (dry battery, rechargeable battery, storage battery or lithium-ion battery) for processing electronic signals. The system circuit board 32 comprises a circuit layout providing a plurality of electrical connectors 321 and indicator lights 322. The indicator lights 322 are adapted to indicate the operation status of the electrical connectors 321 respectively. The power adapter 33 can be a plug type or socket type design electrically connectable to an external power source (for example, city power supply or power generator) to provide the desktop charger with the necessary working voltage.

During installation, the rack 2 is mounted in the accommodation space 10 inside the housing 1 to force the vertical insertion slots 20 into engagement with the flanges 1402 of the face panel 14 and to keep the front recess portion 1401 in flush with the front recess portion 201. At this time, the vertical insertion slots 20 of the rack 2 are respectively kept in the respective vertical insertion slots 140 of the face panel 14. Thereafter, the power supply module 3 is mounted in the bottom side 101 of the accommodation space 10 inside the housing 1 to hold the electrical connectors 321 and the indicator lights 322 in the connector holes 141 and the indicator light holes 142 respectively and to have the power adapter 33 be affixed to the opening 130 of the back support frame 13 and kept in alignment with the adapter hole 181. Thus, the housing 1, the rack 2, and the power supply module 3 are assembled together, forming the desired desktop charger.

Further, the electrical connectors 321 of the system circuit board 32 of the power supply module 3 can be selected from the group of USB 2.0, USB 3.0, HDMI, SATA and eSATA connectors for power and data transmission.

Referring to FIGS. 4-7 and FIGS. 2 and 3 again, when using the desktop charger, put the desktop charger on a desk or platform, and then turn the front cover plate 17 relative to the face panel 14 outwardly through 90° angle from the close position to the open position in line with the top rail 15 and the bottom rail 16, and then push the front cover plate 17 backwardly along the top rail 15 and the bottom rail 16 to a received condition. At this time, the user can insert a mobile electronic product 4 (such as tablet PC, notebook, etc.) into one vertical insertion slot 140 of the face panel 14 and the associating vertical insertion slot 20 of the rack 2, and then insert a transmission cable 41 of the mobile electronic product 4 into one connector hole 141 of the face panel 14 to have the transmission cable 41 be electrically connected to the associating electrical connector 321 of the system circuit board 32 and the control system 31 of the power supply module 3, enabling the mobile electronic product 4 to be electrically charged by the desktop charger. During charging, the associating indicator light 322 is driven to give a visual indication. Further, the indicator lights 322 of the system circuit board 32 and the control system 31 of the power supply module 3 can be full color LEDs capable of giving off red light to indicate under charging, green light to indicate charging complete, or yellow light to indicate standby status. Alternatively, the indicator lights 322 can be configured to provide different flash modes for indicating different operation status. After charging is complete, the control system 31 of the power supply module 3 immediately controls the system circuit board 32 to cut off power supply from the electrical connector 321, and then re-boosts the system subject to predetermined settings. Further, the design of the front recess portion 1401 of the face panel 14 and the front recess portion 201 of the rack 2 facilitates the user to remove the electronic product 4 from the connector hole 141 of the face panel 14. Further, when charging the mobile electronic product 4, the associating electrical connector 321 allows electronic signal and data transmission through the desktop charger transmission cable 41 of the mobile electronic product 4, i.e., the mobile electronic product 4 can be operated to communicate with another external electronic device during charging. Further, because the electronic product 4 is kept in one vertical insertion slot 20 of the rack 2 inside the associating vertical insertion slot 140 of the face panel 14 of the housing 1 during charging, it is well protected against scratches, shocks, impacts and accidental drops. Further, because the desktop charger can charge multiple electronic products 4 at a time, the invention greatly improves the efficiency of charging process and achieves time-saving and labor-saving.

The desktop charger further comprises a first anti-theft device 111 (lock, sensor or alarm) mounted at the bottom panel 11 of the housing 1, and/or a second anti-theft device 191 (lock, sensor or alarm) mounted at the top cover plate 19 of the housing 1 to prevent the desktop charger from being lost or stolen during its charging operation, enhancing safety.

As stated above, a desktop charger in accordance with the invention comprises a housing 1 defining therein an accommodation space 10, a rack 2 mounted in the accommodation space 10 and defining therein a plurality of vertical insertion slots 20 arranged in parallel corresponding to respective vertical insertion slots 140 on a face panel 14 of the housing 1, and a power supply module 3 mounted in the accommodation space 10 and comprising a control system 31, a system circuit board 32, which comprises a plurality of electrical connectors 321 and indicator lights 322 respectively mounted in respective connector holes 141 and indicator light holes 142 of the face panel 14 of the housing 1, and a power adapter 33, which is mounted in an opening 130 on a back support frame 13 of the housing 1 in alignment with an adapter hole 181 on one peripheral cover plate 18 of the housing 1. Thus, mobile electronic products 4 can be inserted through the vertical insertion slots 140 of the face panel 14 of the housing 1 and the associating vertical insertion slots 20 of the rack 2 and electrically connected to the respective electrical connectors 321 for charging as well as for signal and data transmission. Further, the desktop charger can be equipped with a first anti-theft device 111 and/or a second anti-theft device 191 to prevent the desktop charger from being lost or stolen during its charging operation.

In conclusion, the invention provides a desktop charger, which has the features and advantages as follows:

1. A mobile electronic product 4 can be inserted through one vertical insertion slot 140 of the face, panel 14 of the housing 1 into the associating vertical insertion slot 20 of the rack 2 and electrically connected to the respective electrical connector 321 for charging by the power supply module 3, and the electronic product 4 can be operated to transmit signals and data during charging.
2. Multiple mobile electronic products 4 can be respectively inserted through the vertical insertion slots 140 of the face panel 14 of the housing 1 into the respective vertical insertion slots 20 of the rack 2 and electrically connected to the respective electrical connectors 321 for charging by power supply module 3 synchronously, improving the efficiency of charging process and achieving time-saving and labor-saving.

While only one particular embodiment of the invention has been described in detail for purposes of illustration, it is to be understood that various modifications and enhancements can be made thereunto without departing from the spirit and scope of the invention. Accordingly, the invention is not to be limited except as by the appended claims.

What the invention claimed is:

1. A desktop charger, comprising:
   a housing defining therein an accommodation space, said housing comprising a face panel, said face panel comprising a plurality of vertical insertion slots arranged in parallel and a plurality of connector holes arranged in a horizontal line at a bottom side relative to the vertical insertion slots of said face panel, and a front cover plate movable to open and close said face panel;
   a rack mounted in said accommodation space inside said housing, said rack comprising a plurality of vertical insertion slots respectively disposed in communication with the vertical insertion slots of said face panel for the insertion of mobile electronic products to be charged by the desktop charger; and
   a power supply module mounted in said accommodation space inside said housing and disposed at a bottom side of said rack, said power supply module comprising a plurality of electrical connectors respectively mounted in said connector holes of said face panel for the connection of transmission cables of mobile electronic products being inserted into the vertical insertion slots of the face panel and the respective vertical insertion slots of said rack, and a control system electrically connected with said electrical connectors and adapted to provide power supply to each mobile electronic product being electrically connected to one said electrical connector and to control transmission of signals between each said electrical connector and the respective linked mobile electronic product.

2. The desktop charger as claimed in claim 1, wherein said housing comprises a bottom panel, a front support frame perpendicularly upwardly arranged at a front side of said bottom panel and adapted to support said face panel, said front support frame defining therein an opening, a back support frame perpendicularly upwardly arranged at a rear side of said bottom panel opposite to said front support frame, said back support frame defining therein an opening, a plurality of peripheral cover plates respectively mounted between said front support frame and said back support frame at opposing left and right sides and on an outside wall of said back support frame, and a top cover plate horizontally mounted on said front support frame and said back support frame at a top side opposite to said bottom panel.

3. The desktop charger as claimed in claim 2, wherein said front support frame of said housing is a rectangular open frame configured to support said face panel; said back support frame of said housing has a substantially U-shaped profile.

4. The desktop charger as claimed in claim 2, wherein said housing further comprises a top rail and a bottom rail horizontally connected in parallel between respective top ends of said front support frame and said back support frame and affixed to one side edge of said face panel; said front cover plate is slidably coupled between said top rail and said bottom rail and movable out of said top rail and said bottom rail and then turnable relative to said top rail and said bottom rail through 90° angle from an open position where said face panel is left open to a close position where said front cover plate keeps said face panel.

5. The desktop charger as claimed in claim 2, wherein said face panel comprises a plurality of flanges respectively extended from two opposite lateral sides of each of the vertical insertion slots thereof and inserted through the opening of said front support frame into the respective vertical insertion slots of said rack.

6. The desktop charger as claimed in claim 1, wherein the vertical insertion slots of said rack are configured for the insertion of tablet computers, notebook computers, mini notebooks and/or ultrabooks.

7. The desktop charger as claimed in claim 1, wherein said power supply module further comprises a system circuit board and a power adapter respectively electrically connected to said control system, said system circuit board comprising a circuit layout providing said electrical connectors, said power adapter being electrically connectable to an external power source for power input.

8. The desktop charger as claimed in claim 7, wherein said control system comprises a circuit layout providing a built-in power source selected from the group of dry battery, rechargeable battery, storage battery and lithium-ion battery.

9. The desktop charger as claimed in claim 7, wherein said power adapter is selectively configured subject to one of a plug design electrically connectable to a city power outlet and a socket design electrically connectable to a power generator.

* * * * *